United States Patent
Jin

(10) Patent No.: US 9,449,369 B2
(45) Date of Patent: Sep. 20, 2016

(54) IMAGE PROCESSING APPARATUS AND CONTROL METHOD THEREOF

(71) Applicant: SAMSUNG ELECTRONICS CO., LTD., Suwon-si, Gyeonggi-do (KR)

(72) Inventor: Kyoung-shin Jin, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/338,948

(22) Filed: Jul. 23, 2014

(65) Prior Publication Data

US 2015/0104115 A1 Apr. 16, 2015

(30) Foreign Application Priority Data

Oct. 10, 2013 (KR) .................. 10-2013-0120481

(51) Int. Cl.
  *G06K 9/50* (2006.01)
  *G06T 3/60* (2006.01)
  *H04N 21/431* (2011.01)
  *H04N 21/435* (2011.01)

(52) U.S. Cl.
  CPC ............. *G06T 3/60* (2013.01); *H04N 21/4316* (2013.01); *H04N 21/4355* (2013.01); *G06T 2207/30221* (2013.01)

(58) Field of Classification Search
  CPC ........... H04N 1/0044; H04N 1/00482; H04N 1/00496; H04N 1/3877; H04N 1/00421; H04N 1/00424; H04N 1/00453; H04N 1/00458; H04N 1/00466; H04N 1/00474; H04N 7/147; H04N 7/14; H04N 21/4316; H04N 21/4355; H04N 1/100432; G06T 3/60; G06T 2207/30221

USPC ................. 382/296, 298, 276; 345/649, 213, 345/207.99, 173; 358/527
See application file for complete search history.

(56) References Cited

U.S. PATENT DOCUMENTS

| 5,150,200 | A | 9/1992 | Hong | |
|---|---|---|---|---|
| 6,686,909 | B1* | 2/2004 | Endo | ............................. 345/173 |
| 8,159,506 | B2* | 4/2012 | Yano et al. | .................... 345/649 |
| 8,870,775 | B2* | 10/2014 | Oonuki et al. | ................ 600/443 |
| 2005/0237587 | A1* | 10/2005 | Nakamura | ......... H04N 1/00347 358/527 |
| 2006/0017994 | A1* | 1/2006 | Takiyama | ..................... 359/200 |
| 2006/0050151 | A1* | 3/2006 | Fujinawa | ........... H04N 1/00442 348/207.99 |

(Continued)

FOREIGN PATENT DOCUMENTS

KR    20120081651 A  *  7/2012

OTHER PUBLICATIONS

"How to Crochet Left-Handed", htt;://web.archive.org/web/20130415005656/http://crochet.about.com/od/learntocrochet/a/Left_Handed_Crochet.htm, Apr. 15, 2013.

(Continued)

*Primary Examiner* — Mekonen Bekele
(74) *Attorney, Agent, or Firm* — Staas & Halsey LLP

(57) ABSTRACT

An image processing apparatus and a control method thereof are provided. The image processing apparatus includes: a signal receiver to receive an image signal including an image and additional information displayed in the image; a signal processor to process the received image signal; and a controller to generate a reversed image resulting from up-down and/or right-left reversal of the image included in the image signal and to control the signal processor to display the reversed image and the additional information at an area of the reversed image.

14 Claims, 13 Drawing Sheets

(56) References Cited

U.S. PATENT DOCUMENTS

| | | | |
|---|---|---|---|
| 2006/0114214 A1* | 6/2006 | Griffin | G09G 3/346 345/98 |
| 2009/0002395 A1* | 1/2009 | Yamada | H04N 1/0044 345/649 |
| 2011/0187841 A1* | 8/2011 | Lee | H04N 7/147 348/61 |
| 2011/0210970 A1* | 9/2011 | Segawa | G06T 3/60 345/420 |
| 2011/0289105 A1* | 11/2011 | Hershowitz | G06F 17/241 707/769 |
| 2013/0070575 A1* | 3/2013 | Kim | G04G 15/003 368/250 |
| 2014/0055494 A1* | 2/2014 | Mikawa | 345/649 |
| 2014/0068518 A1* | 3/2014 | Liu et al. | 715/835 |
| 2014/0132530 A1* | 5/2014 | Suh | G06F 3/0412 345/173 |

OTHER PUBLICATIONS

"How to Mirror an Image Using CSS3 Transform: Scale", http:jjmonkeyraptor.johanpaul.net/2013/07/how-to-mirror-image-using-css3.html, Jul. 29, 2013.

"How to Flip Images Horizontally Wti HTML Code / eHow", http:jjweb.archive.orgjweb/20130805064216/http://www.ehow.comjhow 8374346 flip-images-horizontally-html-code.html, Aug. 5, 2013.

European Search Report mailed Feb. 5, 2015 in corresponding European Application No. 14170664.8-1908.

* cited by examiner

FIG. 2
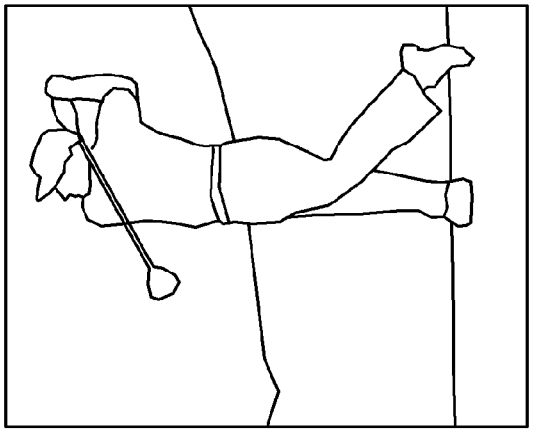
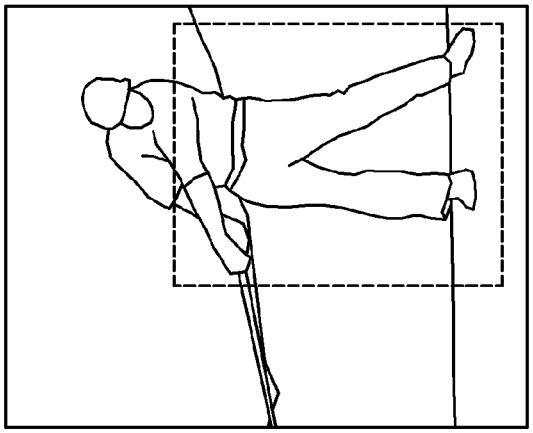
TURN, DON'T DRIVE
That old advice about driving your legs through impact just isn't right anymore. Notice how centered Phil is through impact. Driving your legs here makes you lose your balance, and the bottom of the arc isn't consistent.

FIG. 3
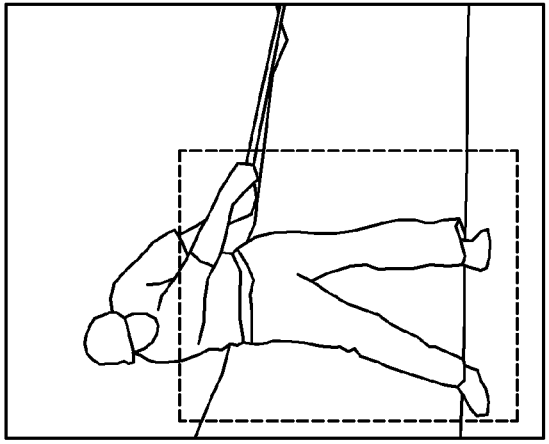
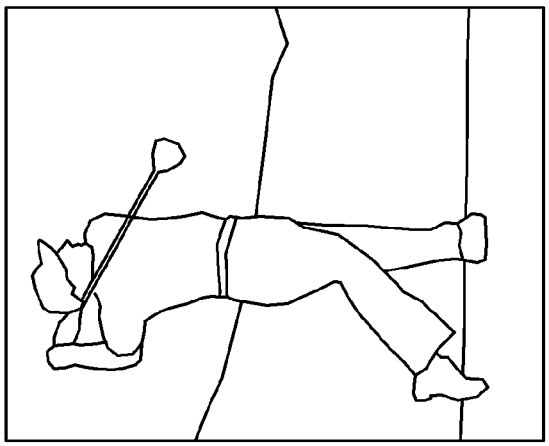
TURN, DON'T DRIVE
That old advice about driving your legs through impact just isn't right anymore. Notice how centered Phil is through impact. Driving your legs here makes you lose your balance, and the bottom of the arc isn't consistent.

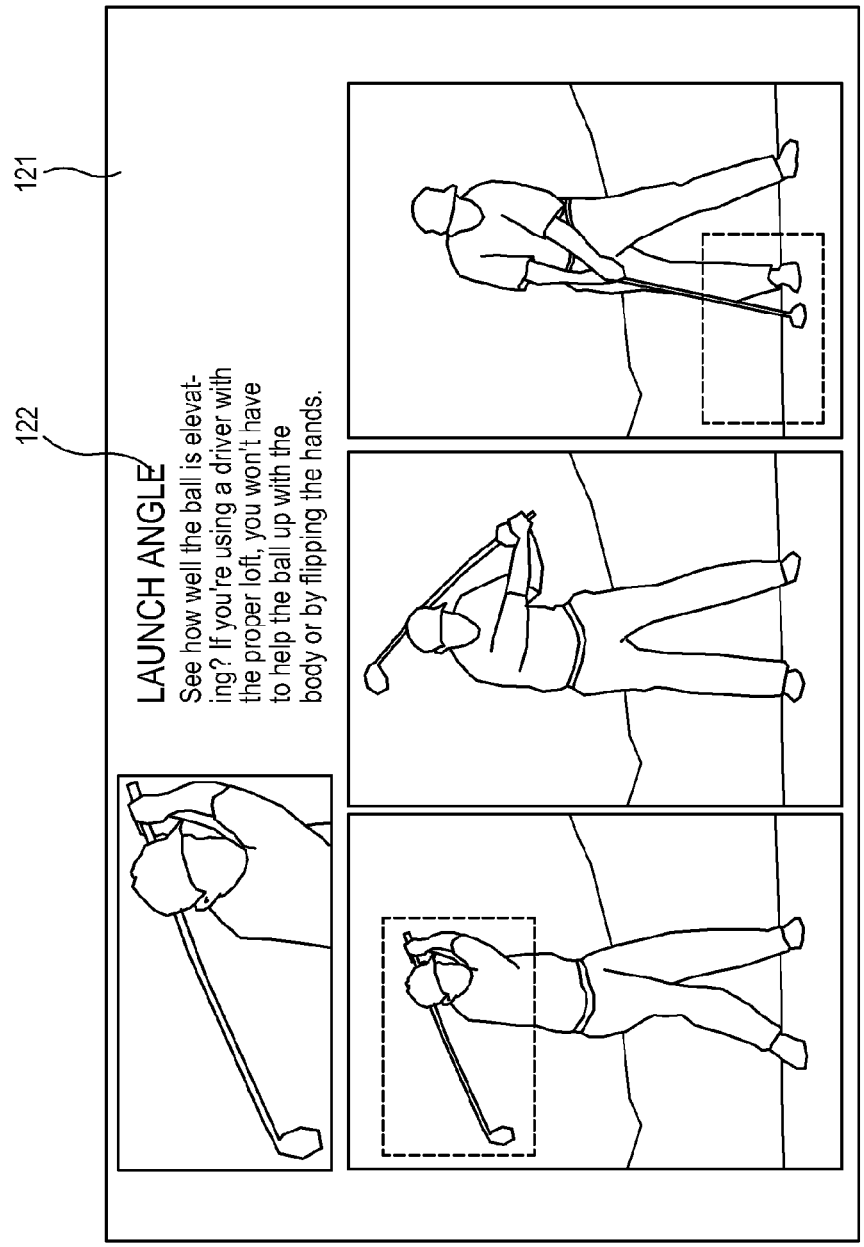

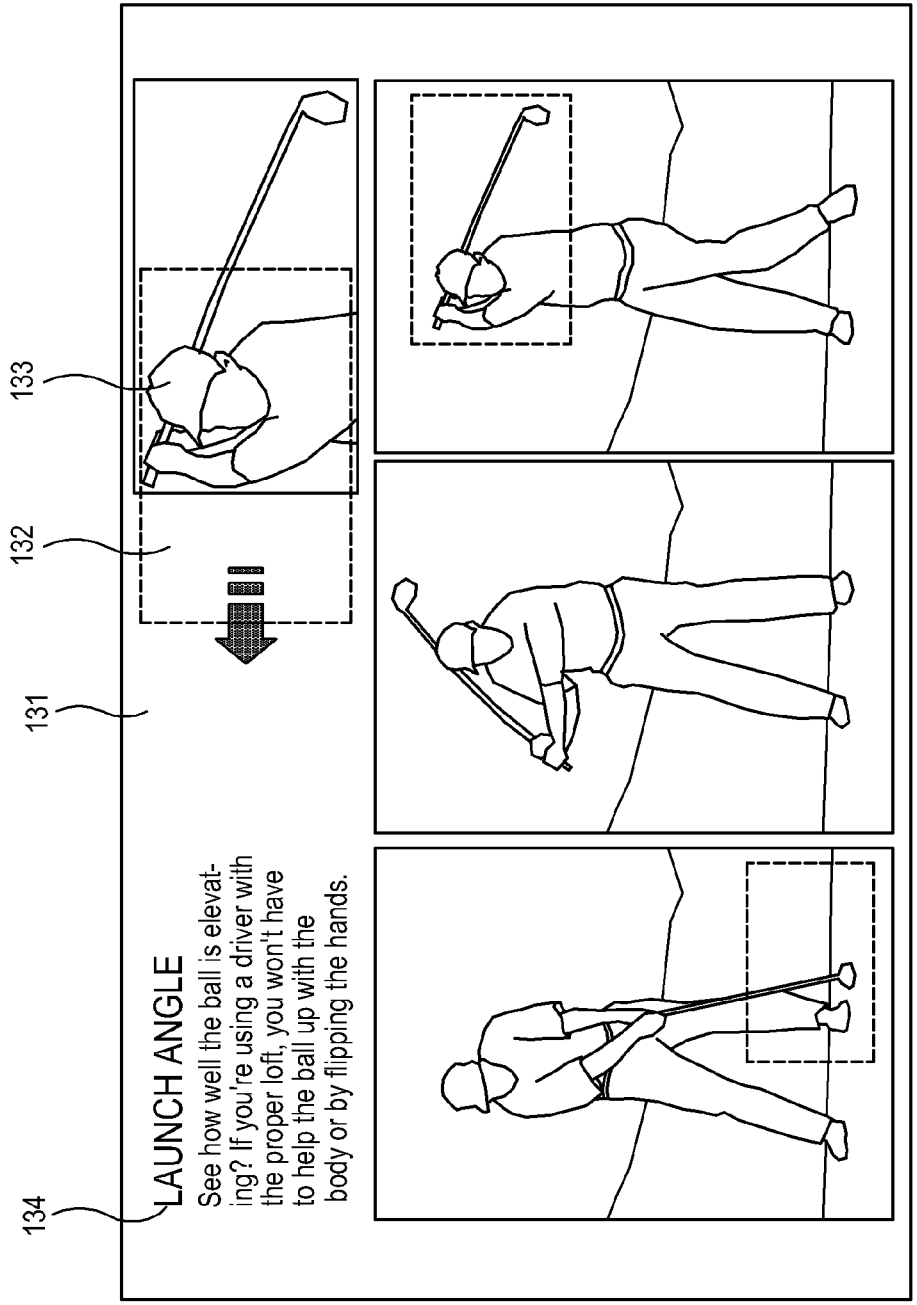

IMAGE PROCESSING APPARATUS AND CONTROL METHOD THEREOF

CROSS-REFERENCE TO RELATED APPLICATION(S)

This application claims priority from Korean Patent Application No. 10-2013-0120481, filed on Oct. 10, 2013 in the Korean Intellectual Property Office, the disclosure of which is incorporated herein by reference.

BACKGROUND

1. Field

Apparatuses and methods consistent with the exemplary embodiments relate to an image processing apparatus and a control method thereof and computer readable storage thereof, and, more particularly, to an image processing apparatus receiving an image signal and processing the image signal to display an image and a control method thereof.

2. Description of the Related Art

An image processing apparatus, such as a TV and a set-top box, processes a received image signal to display an image included in the image signal. Sometimes a user wants to try reversing the displayed image right to left or up to down. For example, when a player in the image is a left-hander in an image of sport content, such as golf and baseball, but the user is a right-hander, the user faces difficulty in imitating a motion or pose of the player in the image even though the user wants to do so since the motion or pose of the player is in reverse in the image view compared to the user's motion or pose. Here, if the image of the received image signal is reversed right to left, the user may easily imitate the motion or pose of the player in the image.

Meanwhile, the image signal may also include additional information, such as a text, in addition to the image, and the image processing apparatus processes the image signal to display the additional information in one area of the image along with the image. However, if the image is displayed in reverse, the additional information over the image is also reversed, making it difficult to easily read the additional information including the text.

What is needed is a system that will reverse the image without reversing the additional information text.

SUMMARY

Additional aspects and/or advantages will be set forth in part in the description which follows and, in part, will be apparent from the description, or may be learned by practice of the invention.

An aspect of one or more exemplary embodiments is to provide an image processing apparatus which is capable of reversely displaying an image for user convenience while maintaining readability of additional information displayed along with the image, a computer readable storage and a control method thereof.

The foregoing and/or other aspects may be achieved by providing an image processing apparatus including: a signal receiver to receive an image signal including an image and additional information displayed in the image; a signal processor to process the received image signal; and a controller to generate a reversed image resulting from up-down or right-left reversal of the image included in the image signal and to control the signal processor to display the reversed image and the additional information at an area of the reversed image.

The image processing apparatus may further include a user input receiver to receive a user input, and the controller may selectively display the reversed image and the additional information according to the user input.

The controller may determine whether to reverse the image corresponding to a type of a user watching the image and selectively display the reversed image and the additional information based on the determination.

The image processing apparatus may further include a storage to store information on the type of the user, and the controller may determine the type of the user watching the image based on the stored information on the type of the user.

The signal receiver may receive the image signal further including information on a type of the image, and the controller may determine the type of the image being currently displayed based on the information on the type of the image.

The controller may determine whether the additional information covers an effective part of the reversed image, and move and display the additional information based on the determination.

The foregoing and/or other aspects may also be achieved by providing a control method of an image processing apparatus, the control method including: receiving an image signal including an image and additional information displayed in the image; generating a reversed image resulting from up-down or right-left reversal of the image included in the image signal; and displaying the reversed image and the additional information at an area of the reversed image.

The control method may further include receiving a user input, and the displaying may include selectively displaying the reversed image and the additional information according to the user input.

The control method may further include determining whether to reverse the image corresponding to a type of a user watching the image, and the displaying may include selectively displaying the reversed image and the additional information based on the determination.

The control method may further include storing information on the type of the user, and the determining whether to reverse the image may include determining the type of the user watching the image based on the stored information on the type of the user.

The receiving the image signal may include receiving the image signal further including information on a type of the image, and the determining whether to reverse the image may include determining the type of the image being currently displayed based on the information on the type of the image.

The control method may further include determining whether the additional information covers an effective part of the reversed image, and the displaying may include moving and displaying the additional information based on the determination.

The foregoing and/or other aspects may also be achieved by providing a method including: receiving a signal comprising an image and additional information; determining whether the image is to be reversed; processing the image responsive to the determining; and displaying the additional information associated with the processed image.

The method may further include producing a display image with the image adjacent the additional information with no overlap.

The method may further include reversing the image responsive to the determining; and moving the additional information to not overlap the image after the reversing.

The foregoing and/or other aspects may also be achieved by providing a non-transitory computer readable storage storing a method, the method including: receiving a signal comprising an image and additional information; determining whether the image is to be reversed; processing the image responsive to the determining; and displaying the additional information associated with the processed image.

As described above, one or more exemplary embodiments may reversely display an image to enhance user convenience while maintaining readability of additional information displayed along with the image.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 2 illustrates an image included in an image signal received by the image processing apparatus according to an exemplary embodiment.

FIG. 3 illustrates a reversed image displayed by the image processing apparatus according to an exemplary embodiment.

FIGS. 12 and 13 illustrate an image included in an image signal and a reversed image thereof, respectively, according to an exemplary embodiment.

DETAILED DESCRIPTION

Figure 1:
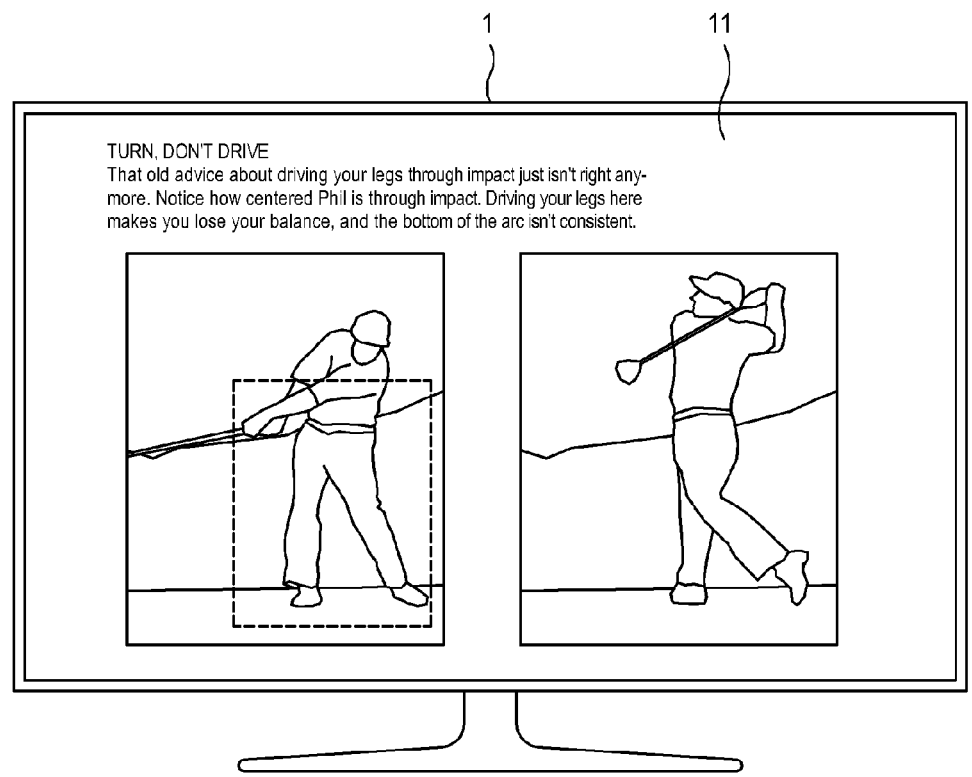
FIG. 1 illustrates an image processing apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Below, exemplary embodiments will be described in detail with reference to the accompanying drawings. FIG. 1 illustrates an image processing apparatus according to an exemplary embodiment. The image processing apparatus 1 according to the present embodiment may be configured as a display apparatus, such as a TV. Alternatively, the image processing apparatus 1 may be configured as a set-top box of a TV. The image processing apparatus 1 may receive an image signal through broadcasting and process the received image signal to display an image 11 included in the image signal. In this case, a user 12 may watch the image 11 displayed on a screen of the image processing apparatus 1.

FIG. 2 illustrates an image included in an image signal received by the image processing apparatus 1 according to an exemplary embodiment. The image 21 included in the image signal received by the image processing apparatus 1 may include various types of content, for example, content related to sport, such as golf, as shown in FIG. 2. The image 21 shows that a golfer swings. Although content of the image 21 is golf in the present embodiment, the content of the image 21 is not limited to golf. Instead, the image 21 may include various types of content, such as a batter's swing or a pitcher's pitching in a baseball. A player shown in the image 21 may be, for example, a left hander. In contrast, a user 12 watching the image processed by the image processing apparatus 1 may be, for example, a right hander. The image signal received by the image processing apparatus 1 may include additional information 22 in addition to the image 21. The additional information 22 may be information explaining the image 21, for instance, as a text. Alternatively, the additional information 22 includes various types of information readable or visible by the user, such as another image, without being limited to a text.

The image processing apparatus 1 according to the present embodiment processes the received image signal to reversely display the image 21 included in the image signal. FIG. 3 illustrates an image processed and displayed by the image processing apparatus 1 according to an exemplary embodiment. The image processing apparatus 1 generates an image 31 ("reversed image") obtained by reversing the image 21 included in the image signal and processes the image signal to display the reversed image 31. As shown in FIG. 3, a player in the reversed image 31 appears reversed right and left (mirror image) from the player in the image 21 shown in FIG. 2. For example, if the player in the image 21 of FIG. 2 is a left hander, the player in the reversed image 31 of FIG. 3 appears to be a right-hander. Thus, if the user is a right-hander, the user may easily copy the player in the reversed image 31 as the player makes motions or poses. In the present embodiment, the reversed image 31 is an image resulting from right-left reversal of the image 21, without being limited thereto. Alternatively, the reversed image 31 may be an image resulting from up-down reversal of the original image. Further the image may be both right to left reversed and up to down (top to bottom) reversed.

Referring to FIG. 3, the image processing apparatus 1 displays additional information 32 which is not reversed but remains intact while displaying the reversed image 31. That is, the additional information 32 of FIG. 3 is substantially the same (and not reversed) as the additional information 22 of FIG. 2 included in the received image signal. Thus, the user may easily read the additional information 32 displayed along with the reversed image 32 while copying the player in the reversed image 31 as the player moves or poses.

Figure 4:
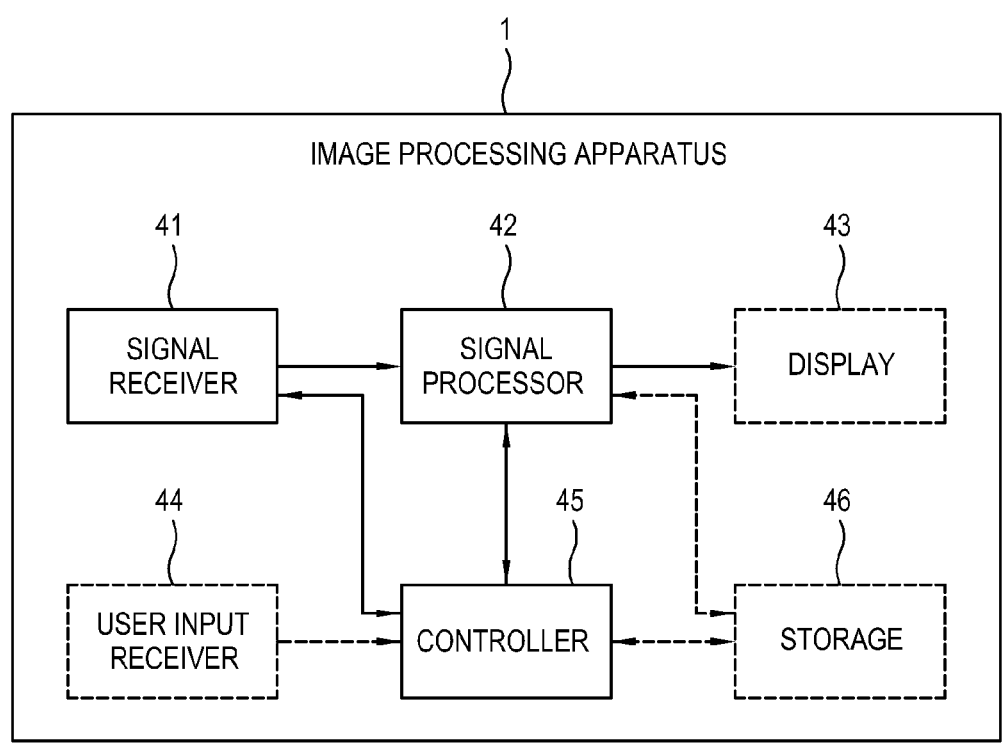
FIG. 4 is a block diagram illustrating a configuration of the image processing apparatus according to an exemplary embodiment.

FIG. 4 is a block diagram illustrating a configuration of the image processing apparatus 1 according to an exemplary embodiment. The image processing apparatus 1 according to the present embodiment includes a signal receiver 41, a signal processor 42 and a controller 45. The signal receiver 41 receives an image signal. The signal receiver 41 may receive an image signal through broadcasting from a broadcasting station. Alternatively, the signal receiver 41 may receive an image signal from an imaging device, such as a DVD player, a PC and a set-top box, may receive an image signal from a server through a network, such as the Internet, may receive an image signal from a wirelessly connected portable terminal, such as a smart phone and a smart pad, or receive an image signal in a data format stored in a storage device, such as a USB storage medium.

The signal processor 42 processes the image signal received by the signal receiver 41. The signal processor 42 processes the image signal to display a reversed image of an image included in the image signal according to the controller 45 and to display additional information included in the image signal in one area of the reversed image. The controller 45 generates the reversed image of the image included in the image signal and controls the signal processor 42 to simultaneously display the reversed image and the additional information in one area of the reversed image. The image processing apparatus 1 may further include a storage 46 to store information or data on the image to generate the reversed image resulting from reversal of the image.

The image processing apparatus 1 may further include a display 43 to display the reversed image and the additional information processed by the signal processor 42. The display 43 may display the reversed image and the additional information using any one of various modes including an LCD, PDP and OLED.

Figure 5:
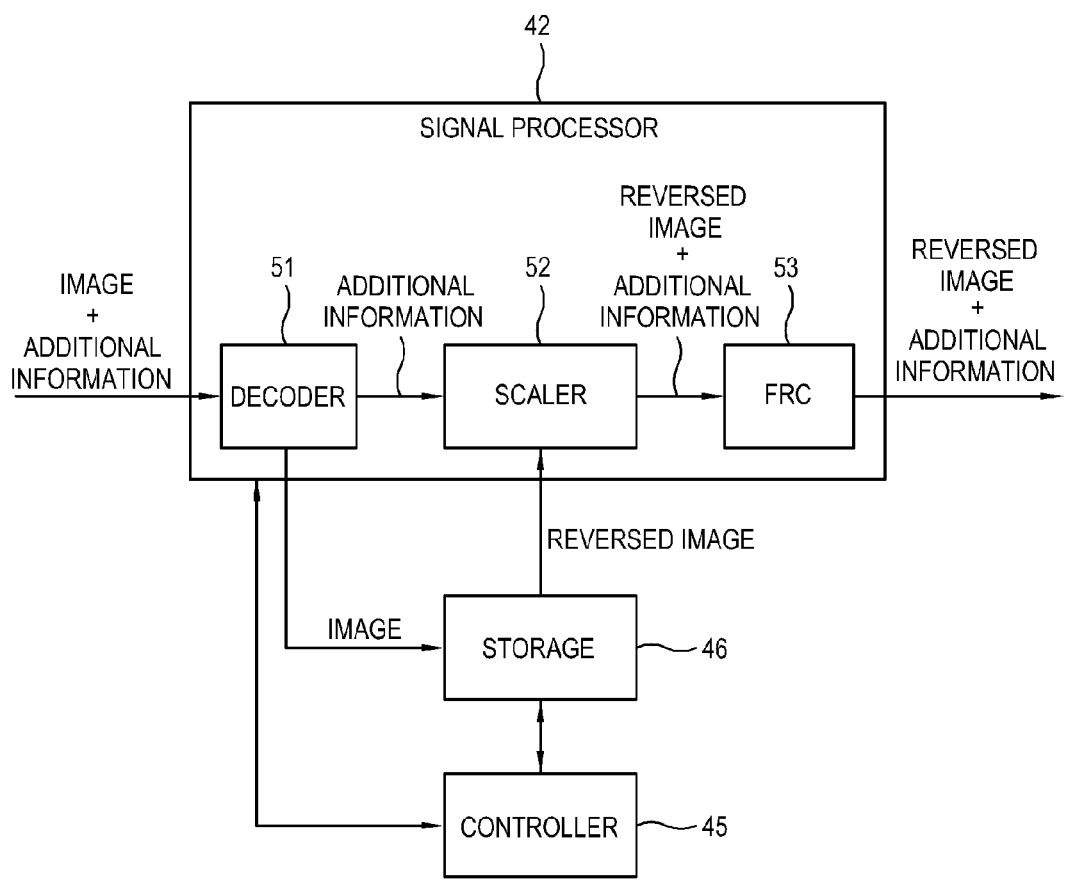
FIG. 5 is a block diagram illustrating a configuration of a signal processor according to an exemplary embodiment.

FIG. 5 is a block diagram illustrating a configuration of the signal processor 42 according to an exemplary embodiment. The signal processor 42 may include a decoder 51, a scaler 52 and a frame rate converter (FRC) 53. The decoder 51 receives an image signal including an image and additional information and decodes the image signal to extract the image and the additional information. For example, the image and the additional information may be included as separate layers in the image signal, and a layer of the image and a layer of the additional information may be separately extracted. Alternatively, when the image and the additional information overlap in a single layer, an area of the additional information may be recognized by image recognition processing, such as optical character recognition (OCR), to separately extract the image and the additional information. The extracted image is temporarily stored in the storage 46, and the image stored in the storage 46 is converted into a reversed image according to control by the controller 45, thereby generating the reversed image. The reversed image generated using the storage 46 is transferred to the scaler 52. The scaler 52 combines a layer of the reversed image and the layer of the additional information, which is not reversed, received from the decoder 51 into one frame. The scaler 52 may selectively conduct an operation of combining the reversed image and the additional information and an operation of combining the original image not reversed and the additional information according to control by the controller 45. The FRC 53 converts a rate of frames obtained by combining the image or reversed image with the additional information according to display characteristics of the display 43 and outputs frames of which the rate has been converted.

Figure 6:
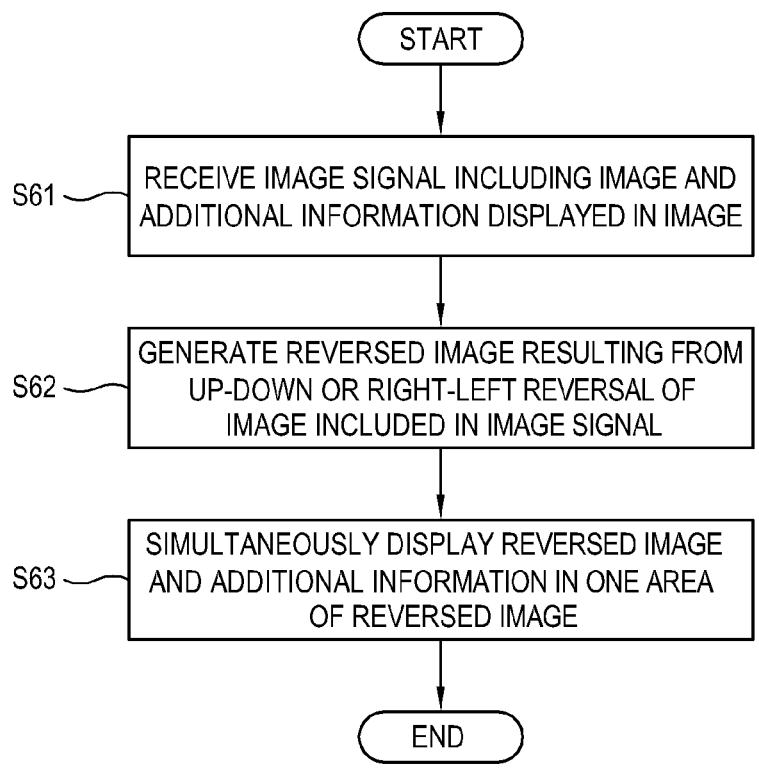
FIGS. 6 to 11 are flowcharts illustrating operations of the image processing apparatus according to exemplary embodiments.

FIG. 6 is a flowchart illustrating operations of the image processing apparatus 1 according to an exemplary embodiment. The operations of the image processing apparatus 1 may be carried out according to control by the controller 45. First, in operation S61, the image processing apparatus 1 receives an image signal including an image and additional information. In operation S62, the image processing apparatus 1 generates a reversed image resulting from up-down or right-left reversal of the image included in the image signal. In operation S63, the image processing apparatus 1 processes the image signal to simultaneously display the reversed image and the additional information not reversed in one area of the reversed image.

Figure 7:
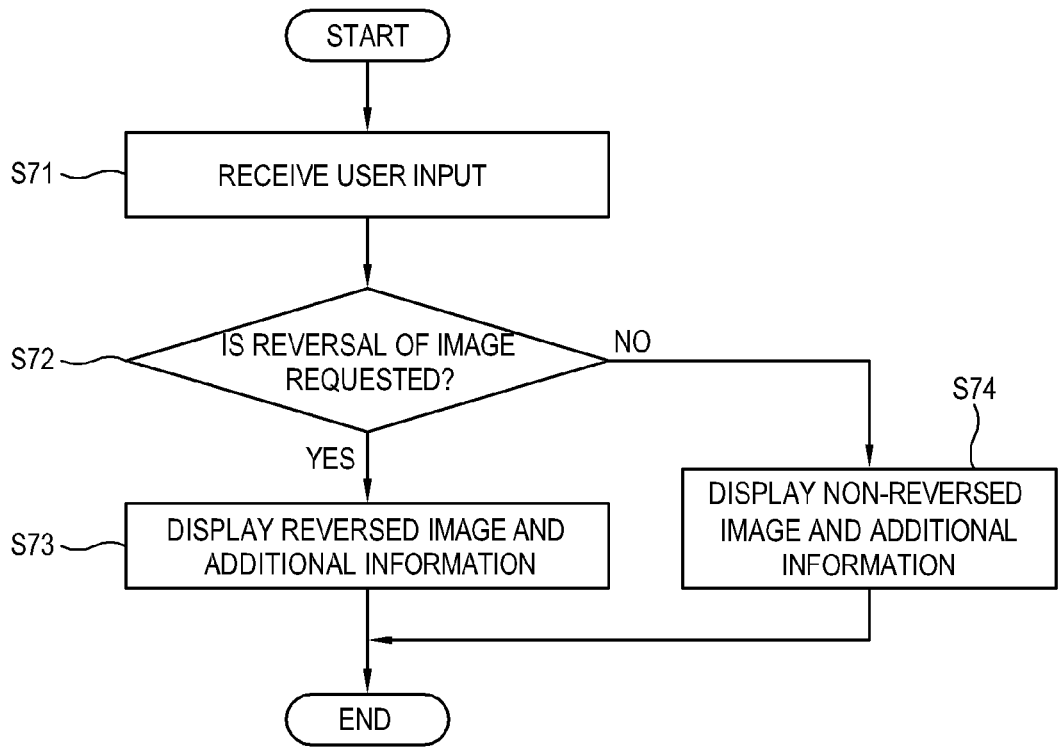

FIG. 7 is a flowchart illustrating operations of the image processing apparatus 1 according to another exemplary embodiment. In the present embodiment, the image processing apparatus 1 may further include a user input receiver 44 to receive a user input as shown in FIG. 4. The user input receiver 44 may be configured, for example, as a remote control signal receiver to receive a remote control signal including a user input from a remote control or as a manipulation panel to receive a manipulation corresponding to a user input. Referring to FIG. 7, in operation S71, the image processing apparatus 1 receives a user input while displaying an image. In operation S72, the image processing apparatus 1 verifies the user input and determines whether the user input is a request for reversal of an image. If the user input is the request for reversal of the image, the image processing apparatus 1 reverses the image and displays the reversed image and additional information in operation S73. If the user input is not the request for reversal of the image, the image processing apparatus 1 displays the original image, not reversed, and the additional information in operation S74. Accordingly, when the user wishes to try reversing the image while watching the image, the user may conveniently watch the reversed image anytime, thereby improving user convenience. Also, when a user input is made while the reversed image is being displayed, the image processing apparatus 1 may display the original image not reversed.

Figure 8:
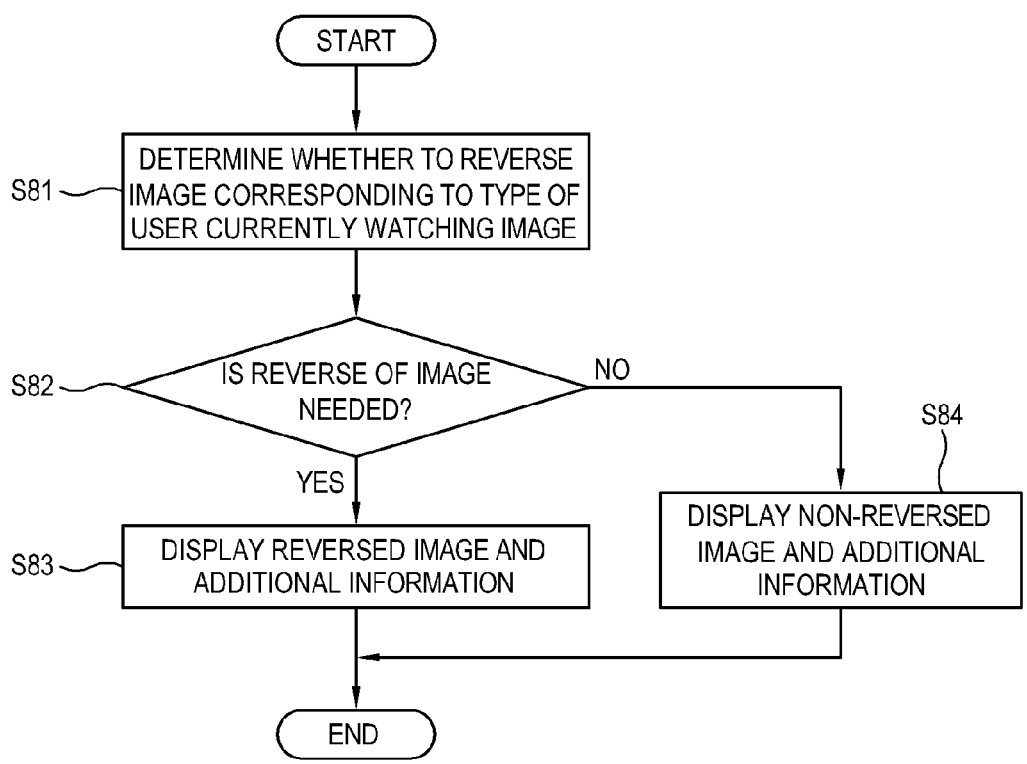

FIG. 8 is a flowchart illustrating operations of the image processing apparatus 1 according to still another exemplary embodiment. In operation S81, the image processing apparatus 1 verifies a type of a user currently watching an image and determines whether to reverse the image based on the type of the user. The type of the user may be whether the user is a right-hander or left-hander. When it is determined based on the type of the user that reversal of the image is needed in operation S82, the image processing apparatus 1 reverses the image and displays the reversed image and additional information in operation S83. For example, when the user is a right-hander but the image is of a left-hander, it may be determined that the image needs reversing. When it is determined based on the type of the user that reversal of the image is not needed in operation S82, the image processing apparatus 1 displays the original image, not reversed, and the additional information in operation S84. Accordingly, the image may be automatically reversed and displayed based on the type of the user currently watching the image, thereby enhancing user convenience.

Figure 9:
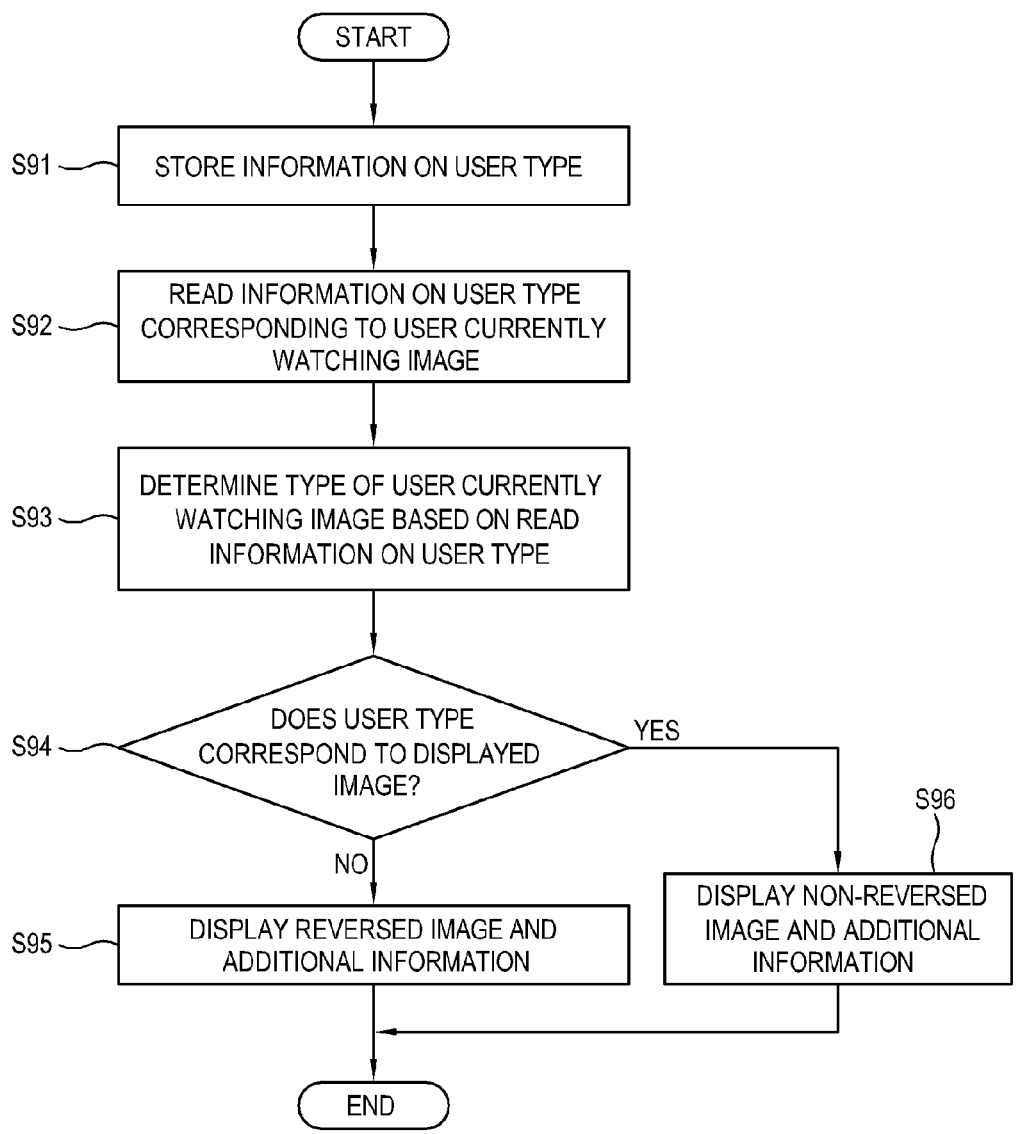

FIG. 9 is a flowchart illustrating operations of the image processing apparatus 1 according to yet another exemplary embodiment. In operation S91, the image processing apparatus 1 stores information on a type of the user. The information on the type of the user may include, for example, information on whether the user is a right-hander or left-hander. The information on the type of the user may be received by a user input using the user input receiver 44. As the information on the type of the user, identification information on each of a plurality of users and information on a type of each of the users may be stored in a form of a profile. The information on the type of the user may be stored, for example, in one storage region of the storage 46 of FIG. 4 or in a separate storage medium.

In operation S92, the image processing apparatus 1 identifies a user currently watching an image and reads information on a type of the identified user among the stored information on the type of the user. The user currently watching the image may be identified by a designated default, facial recognition using a tool such as a camera, a microphone and a motion sensor, or an input by the user currently watching the image. In operation S93, the image processing apparatus 1 determines the type of the user currently watching the image based on the read information on the type of the user. In operation S94, the image processing apparatus 1 determines whether the type of the user currently watching the image corresponds to the image being displayed. When the type of the user currently watching the image does not correspond to the image being displayed, the image processing apparatus 1 displays a reversed image obtained by reversing the image and additional information in operation S95. For example, when the type of the current user is a right-hander but the image is for a left-hander, it may be determined that the type of the user currently watching the image does not correspond to the image being displayed. When the type of the user currently watching the image corresponds to the image being displayed in operation S94, the image processing apparatus 1 displays the original image, not reversed, and the additional information in operation S96.

Figure 10:
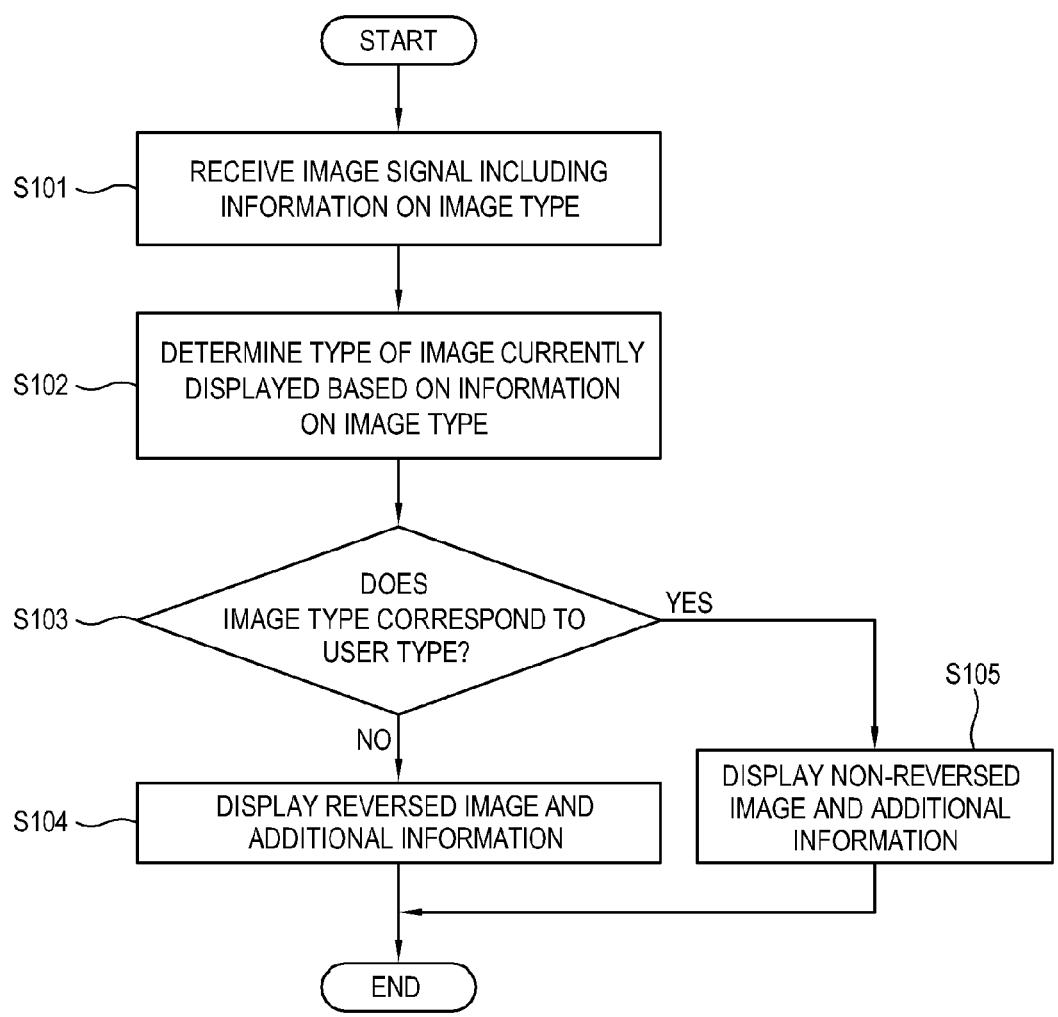

FIG. 10 is a flowchart illustrating operations of the image processing apparatus 1 according to still another exemplary embodiment. In operation S101, the image processing apparatus 1 receives an image signal including information on a type of an image. The type of the image may be divided into an image for a left-hander (as shown in FIG. 2, the player in the image is a left-hander) and an image for a right-hander (the player in the image is a right-hander). The image signal received by the image processing apparatus 1 may include the information on the type of the image. The information on the type of the image may be included in the image signal for transmission by verifying the type of the image before transmitting the image signal, for example, in broadcasting.

In operation S102, the image processing apparatus 1 determines a type of an image currently being displayed based on the information on the type of the image. In operation S103, the image processing apparatus 1 determines whether the type of the image currently being displayed corresponds to a type of a user currently watching the image. When the type of the image currently being displayed does not correspond to the type of the user currently watching the image, the image processing apparatus 1 displays a reversed image obtained by reversing the image and combining it with the additional information in operation S104. For example, when the image is for a left-hander but the user is a right-hander, it may be determined that the type of the image currently being displayed does not correspond to the type of the user currently watching the image. When the type of the image currently being displayed corresponds to the type of the user currently watching the image in operation S103, the image processing apparatus 1 displays the original image, not reversed, and the additional information in operation S105. Alternatively, the image processing apparatus 1 may reverse the image corresponding to the type of the user during a period in which the image signal including the information on the type of the image is received, and display the original image, not reversed, when the image signal does not include the information on the type of the image. In broadcasting, while transmitting an image signal, the information on the type of the image may be included based on the content of the image during a period in which the reversal of the image is available.

Figure 11:
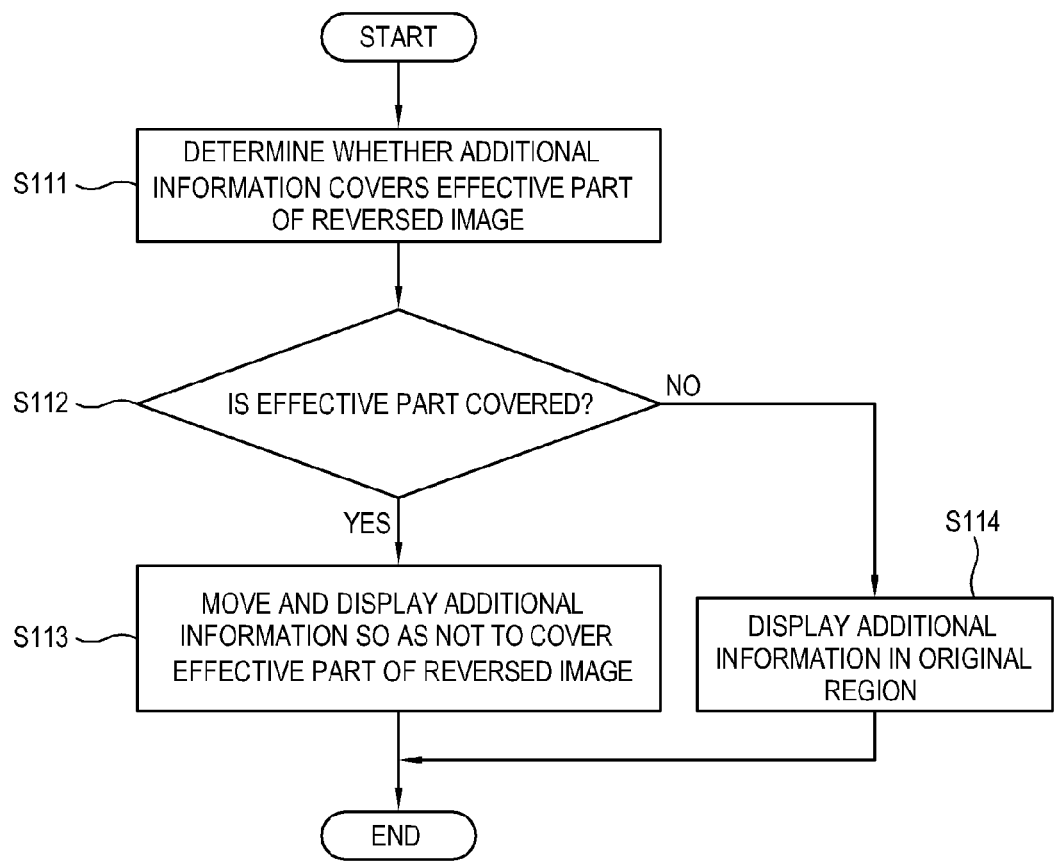

FIG. 11 is a flowchart illustrating operations of the image processing apparatus 1 according to yet another exemplary embodiment. In operation S111, the image processing apparatus 1 determines whether additional information covers an effective part of a reversed image when the reversed image is displayed. The effective part of the reversed image is a portion that the user may need to see when the user watches the reversed image, and may be an important part. FIGS. 12 and 13 illustrate an image included in an image signal and a reversed image thereof, respectively. Referring to FIG. 12, an image 121 and additional information 122 are displayed. In this state, the additional information 122 does not disturb the user in watching the image 121. Referring to FIG. 13, a reversed image 131 of the image 121 and a region 132 in which the additional information 122 used to be present are displayed. In this case, if the additional information 122 is displayed at the original region 132, an effective part 133 of the reversed image 131 may be covered by or overlap with the additional information 122, disturbing the user's view. Whether the additional information 122 covers the effective part 133 of the reversed image 131 may be determined by image analysis of the reversed image 131. For example, when a difference in pixel values between certain neighboring pixels within the region 132 of the additional information 122 increases to a preset threshold or higher due to reversal, it may be determined that the effective part 133 of the reversed image 131 is present in the region 132.

Returning to FIG. 11, when it is determined that the additional information covers (or obscures) the effective part of the reversed image in operation S112, the image processing apparatus 1 moves and displays the additional information so as not to cover the effective part of the reversed image in operation S113. Referring to FIG. 13, when the additional information 122 is displayed in the original region 132, the effective part 133 of the reversed image 131 is covered, and accordingly the additional information 134 may be moved aside by a predetermined distance and displayed, such that it is established or brought about that the additional information does not obscure the image or a substantive part thereof. For example, the additional information 134 may be moved to a region in which a change in pixel value between neighboring pixels is the threshold or lower, that is, a blank area having no effective image. Returning back to FIG. 11, when it is determined that the additional information does not cover the effective part of the reversed image in operation S112, the image processing apparatus 1 displays the additional information in the original region in the reversed image in operation S114. Accordingly, the user is not disturbed by the additional information in watching the reversed image, thereby enhancing user convenience.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus, comprising:
    a signal receiver to receive an image signal comprising an image and additional information displayed in the image;
    a signal processor to process the received image signal; and
    a controller to generate a reversed image resulting from one of an up-down and a right-left reversal of the image comprised in the image signal and to control the signal processor to display the reversed image and the additional information at an area of the reversed image where the additional information is displayed without reversal before and after image reversal,
    wherein the controller determines whether the additional information covers an effective part of the reversed image, and moves and displays the additional information based on the determination to uncover and expose the effective part of the reversed image.

2. The image processing apparatus of claim 1, further comprising a user input receiver to receive a user input, wherein the controller selectively displays the reversed image and the additional information according to the user input.

3. The image processing apparatus of claim 1, wherein the controller determines whether to reverse the image corresponding to a type of a user watching the image and selectively displays the reversed image and the additional information based on the determination.

4. The image processing apparatus of claim 3, further comprising a storage to store information on the type of the user, wherein the controller determines the type of the user watching the image based on the stored information on the type of the user.

5. The image processing apparatus of claim 3, wherein the image signal received by the signal receiver further comprises information on a type of the image, and the controller determines the type of the image being currently displayed based on the information on the type of the image and determines whether to reverse the image based on the information on the type of the image.

6. A control method of an image processing apparatus, the control method comprising:
   receiving an image signal comprising an image and additional information displayed in the image;
   generating a reversed image resulting from one of an up-down and a right-left reversal of the image comprised in the image signal;
   displaying the reversed image and the additional information at an area of the reversed image where the additional information is displayed without reversal before and after image reversal; and
   determining whether the additional information covers an effective part of the reversed image, and the displaying comprises moving and displaying the additional information based on the determination to uncover and expose the effective part of the reversed image.

7. The control method of claim 6, further comprising receiving a user input, wherein the displaying comprises selectively displaying the reversed image and the additional information according to the user input.

8. The control method of claim 6, further comprising determining whether to reverse the image corresponding to a type of a user watching the image, wherein the displaying comprises selectively displaying the reversed image and the additional information based on the determination.

9. The control method of claim 8, further comprising storing information on the type of the user, wherein the determining whether to reverse the image comprises determining the type of the user watching the image based on the stored information on the type of the user.

10. The control method of claim 8, wherein the received image signal further comprises information on a type of the image, and wherein the determining whether to reverse the image comprises determining the type of the image being currently displayed based on the information on the type of the image.

11. A method, comprising:
    receiving a signal comprising an image and additional information;
    determining whether the image is to be reversed;
    processing the image responsive to the determining; and
    displaying the additional information associated with the processed image,
    wherein displaying further comprises displaying the additional information without reversal before and after image reversal, and
    the method further comprising determining whether the additional information covers an effective part of the processed image, and the displaying comprises moving and displaying the additional information based on the determination to uncover and expose the effective part of the reversed image.

12. A method as recited in claim 11, wherein a display image is produced with the image adjacent the additional information with substantively no overlap.

13. A method as recited in claim 11, wherein the processing comprises:
    reversing the image responsive to the determining; and
    establishing the additional information as not obscuring the image after the reversing.

14. A non-transitory computer readable medium having instructions code stored thereon, the instructions when being executed causing one or more processing units to perform the operations of a method for an image display, the method comprising
    receiving a signal comprising an image and additional information;
    determining whether the image is to be reversed;
    processing the image responsive to the determining; and
    displaying the additional information associated with the processed image,
    wherein displaying further comprises displaying the additional information without reversal before and after image reversal, and
    wherein further comprising determining whether the additional information covers an effective part of the processed image, and the displaying comprises moving and displaying the additional information based on the determination to uncover and expose the effective part of the reversed image.

* * * * *